US010879009B2

(12) United States Patent
Shiba et al.

(10) Patent No.: US 10,879,009 B2
(45) Date of Patent: Dec. 29, 2020

(54) ELECTROLYTE SOLUTION FOR ELECTROLYTIC CAPACITORS, AND ELECTROLYTIC CAPACITOR

(71) Applicant: SANYO CHEMICAL INDUSTRIES, LTD., Kyoto (JP)

(72) Inventors: Takahiro Shiba, Kyoto (JP); Fumiyuki Tanabe, Kyoto (JP); Yoshihiko Akazawa, Kyoto (JP); Takao Mukai, Kyoto (JP); Hideki Kimura, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 337 days.

(21) Appl. No.: 16/088,646

(22) PCT Filed: Mar. 23, 2017

(86) PCT No.: PCT/JP2017/011829
§ 371 (c)(1),
(2) Date: Sep. 26, 2018

(87) PCT Pub. No.: WO2017/170169
PCT Pub. Date: Oct. 5, 2017

(65) Prior Publication Data
US 2019/0108946 A1 Apr. 11, 2019

(30) Foreign Application Priority Data

Mar. 29, 2016 (JP) ................................. 2016-065439

(51) Int. Cl.
*H01G 9/035* (2006.01)
(52) U.S. Cl.
CPC .................... *H01G 9/035* (2013.01)
(58) Field of Classification Search
CPC .................................................... H01G 9/035
See application file for complete search history.

(56) References Cited

U.S. PATENT DOCUMENTS

| | | | |
|---|---|---|---|
| 3,547,423 A | 12/1970 | Alfred et al. | |
| 4,885,115 A * | 12/1989 | Yokoyama | H01G 9/022 252/62.2 |
| 6,258,288 B1 * | 7/2001 | Miyoshi | H01G 9/022 252/62.2 |
| 6,307,732 B1 * | 10/2001 | Tsubaki | H01G 9/022 252/62.2 |
| 8,828,261 B2 | 9/2014 | Nishitani et al. | |
| 2004/0061991 A1 | 4/2004 | Abe et al. | |
| 2005/0053843 A1 | 3/2005 | Takahashi | |

FOREIGN PATENT DOCUMENTS

| | | |
|---|---|---|
| CN | 1117323 | 2/1996 |
| CN | 1511326 | 7/2004 |
| CN | 101452767 | 7/2011 |
| EP | 0 684 620 | 11/1995 |
| GB | 1 524 668 | 9/1978 |
| GB | 2 447 724 | 9/2008 |
| JP | 58-96723 | 6/1983 |
| JP | 06-302475 | 10/1994 |
| JP | 9-63896 | * 3/1997 |
| JP | 2000-315628 | 11/2000 |
| JP | 2001-76974 | 3/2001 |
| JP | 2012-89660 | 5/2012 |
| JP | 2012-164777 | 8/2012 |
| JP | 2013-153149 | 8/2013 |
| TW | 201334002 | 8/2013 |

OTHER PUBLICATIONS

Translation for JP 9-63898, Mar. 7, 1997.*
International Search Report dated Jun. 13, 2017 in International (PCT) Application No. PCT/JP2017/011829.

* cited by examiner

*Primary Examiner* — C Melissa Koslow
(74) *Attorney, Agent, or Firm* — Wenderoth, Lind & Ponack, L.L.P.

(57) ABSTRACT

The present invention aims to provide an electrolyte solution for electrolytic capacitors and an electrolytic capacitor, in which the electrolyte solution has high sparking voltage and good heat resistance and does not readily solidify even at low temperatures, so that the electrolytic capacitor can be driven even in cold areas. The electrolyte solution for electrolytic capacitors of the present invention contains a solvent (C); and an electrolyte, the electrolyte consisting of a salt of a diprotic acid component (A) and a base (B), the diprotic acid component (A) containing two or more diprotic acids, wherein the two or more diprotic acids are characterized such that a mixture (E) of two or more acid anhydrides corresponding to a diprotic acid mixture containing the two or more diprotic acids is a liquid at 50° C., with the molar ratio of the acid anhydrides being the same as that of the diprotic acids in the diprotic acid component (A).

12 Claims, No Drawings

ELECTROLYTE SOLUTION FOR ELECTROLYTIC CAPACITORS, AND ELECTROLYTIC CAPACITOR

TECHNICAL FIELD

The present invention relates to electrolyte solutions for electrolytic capacitors and electrolytic capacitors including the same. Specifically, the present invention relates to electrolyte solutions suitable for aluminum electrolytic capacitors and electrolytic capacitors including the same.

BACKGROUND ART

Conventional electrolytic capacitors such as aluminum electrolytic capacitors have a structure in which an anode with a dielectric, a cathode for current collection, and a separator holding an electrolyte solution between the anode and the cathode are enclosed in a sealed container. Winding-type and laminate-type electrolytic capacitors are widely known.

Electrolytic capacitors commonly use, as an electrolyte solution, a solution in which an ammonium salt of an acid such as 1,6-decanedicarboxylic acid is dissolved in a polar solvent such as ethylene glycol, so that high sparking voltage can be obtained (e.g., Patent Literature 1). However, such an electrolyte solution unfortunately has insufficient heat resistance.

In addition, an electrolyte solution containing alkenyl succinic acid or a salt thereof is suggested as an electrolyte having good heat resistance (e.g., Patent Literature 2).

CITATION LIST

Patent Literature

Patent Literature 1: JP 2001-76974 A
Patent Literature 2: JP 2000-315628 A

SUMMARY OF INVENTION

Technical Problem

Electrolyte solutions in which an alkenyl succinic acid or a salt thereof is solely used as an electrolyte have high sparking voltage and heat resistance, but readily solidify at low temperatures. Disadvantageously, electrolytic capacitors containing such an electrolyte solution have a narrow temperature range for use and cannot be used in cold areas.

The present invention aims to provide an electrolyte solution for electrolytic capacitors and an electrolytic capacitor, in which the electrolyte solution has high sparking voltage and good heat resistance and does not readily solidify even at low temperatures, so that the electrolytic capacitor can be driven even in cold areas.

Solution to Problem

The present inventors conducted studies to solve the above problems, and arrived at the present invention.

Specifically, the present invention relates to an electrolyte solution for electrolytic capacitors, the electrolyte solution containing: a solvent (C); and an electrolyte, the electrolyte consisting of a salt of a diprotic acid component (A) and a base (B), the diprotic acid component (A) containing two or more diprotic acids, wherein the two or more diprotic acids are characterized such that a mixture (E) of two or more acid anhydrides corresponding to a diprotic acid mixture containing the two or more diprotic acids is a liquid at 50° C., with the molar ratio of the acid anhydrides being the same as that of the diprotic acids in the diprotic acid component (A); and the present invention also relates to an electrolytic capacitor including the same.

Advantageous Effects of Invention

The present invention provides an electrolyte solution for electrolytic capacitors and an electrolytic capacitor, in which the electrolyte solution has high sparking voltage and good heat resistance and does not readily solidify even at low temperatures, so that the electrolytic capacitor can be driven even in cold areas.

DESCRIPTION OF EMBODIMENTS

The electrolyte solution for electrolytic capacitors of the present invention contains a solvent (C); and an electrolyte, the electrolyte consisting of a salt of a diprotic acid component (A) and a base (B), the diprotic acid component (A) containing two or more diprotic acids, wherein the two or more diprotic acids are characterized such that a mixture (E) of two or more acid anhydrides corresponding to a diprotic acid mixture containing the two or more diprotic acids is a liquid at 50° C., with the molar ratio of the acid anhydrides being the same as that of the diprotic acids in the diprotic acid component (A).

Herein, the mixture of two or more acid anhydrides corresponding to the diprotic acid mixture containing the two or more diprotic acids (the two or more diprotic acids contained in the diprotic acid component (A)), with the molar ratio of the acid anhydrides being the same as that of the diprotic acids in the diprotic acid component (A), may be simply referred to as an acid anhydride mixture corresponding to the diprotic acid mixture.

The diprotic acid component (A) in the present invention contains two or more diprotic acids. The two or more diprotic acids are characterized such that the acid anhydride mixture (E) corresponding to the diprotic acid mixture is a liquid at 50° C.

With the acid anhydride mixture (E) that is a liquid at 50° C., it is possible to produce an electrolyte solution for electrolytic capacitors and an electrolytic capacitor, in which the electrolyte solution has good low-temperature characteristics, does not solidify at all even at −20° C. for example, so that the electrolytic capacitor can be sufficiently used and driven even in cold areas. Conversely, if the acid anhydride mixture (E) is a solid at 50° C., the resulting electrolyte solution for electrolytic capacitors has poor low-temperature characteristics.

It is essential that the two or more diprotic acids in the diprotic acid component (A) are characterized such that the acid anhydride mixture (E) corresponding to the diprotic acid mixture is a liquid at 50° C. Yet, the electrolyte solution for electrolytic capacitors may contain other monoprotic acid(s) and diprotic acid(s).

The two or more diprotic acids contained in the diprotic acid component (A) are usually diprotic acids that can be converted into acid anhydrides. The diprotic acids that can be converted into acid anhydrides are diprotic acids that are sterically capable of taking the form of an acid anhydride. The diprotic acids that can be converted into acid anhydrides are preferably compounds represented by the later-described formula (1), for example.

The acid anhydride mixture (E) is a mixture of two or more acid anhydrides, wherein the mixture corresponds to a diprotic acid mixture containing the two or more diprotic acids contained in the diprotic acid component (A), with the molar ratio of the acid anhydrides being the same as that of the diprotic acids in the diprotic acid component (A). The acid anhydride mixture (E) is a mixture of two or more acid anhydrides respectively corresponding to the two or more diprotic acids contained in the diprotic acid component (A), and the molar ratio of the acid anhydrides is the same as the molar ratio of the corresponding diprotic acids contained in the diprotic acid component (A).

As an example, a case is described where the diprotic acid component (A) contains m diprotic acids (a1) to (am) (m is an integer of two or greater), each diprotic acid being contained at a molar ratio of 1. In this case, the acid anhydride mixture (E) is a mixture of m acid anhydrides, containing acid anhydrides (a1) to (am) each at a molar ratio of 1, which respectively correspond to the diprotic acids (a1) to (am). An acid anhydride corresponding to a diprotic acid may also be referred to as an acid anhydride of the diprotic acid.

It does not matter whether the acid anhydrides corresponding to the respective diprotic acids contained in the diprotic acid component (A) are liquids or solids at 50° C. The present invention is characterized in that an acid anhydride of a diprotic acid mixture of the two or more diprotic acids contained in the diprotic acid component (A) (thus, an acid anhydride mixture of two or more acid anhydrides) is a liquid at 50° C. Some diprotic acids are sterically incapable of taking the form of an acid anhydride. In the present invention, the states of the two or more diprotic acids contained in the diprotic acid component (A) are determined by the mixture (E) of two or more acid anhydrides which corresponds to a mixture of the two or more diprotic acids.

The electrolyte solution for electrolytic capacitors of the present invention may optionally contain a diprotic acid that cannot be converted into an acid anhydride (that is sterically incapable of taking the form of an acid anhydride) as long as the effects of the present invention are not impaired.

The state of the acid anhydride mixture (E) may be determined by the state of an acid anhydride mixture obtained by dehydration reaction of a mixture of the two or more diprotic acids contained in the diprotic acid component (A). Alternatively, as described in Production Examples 1 and 2 herein, in the case of a reaction path in which an acid anhydride mixture of the diprotic acid is obtained, for example, by reaction of maleic anhydride with olefin, and the diprotic acid is obtained by hydrolysis of the mixture, the state can be determined by the state of the acid anhydride mixture as an intermediate.

The diprotic acid component (A) preferably contains three or more diprotic acids. The diprotic acid component (A) preferably contains eight or less, more preferably six or less diprotic acids. The diprotic acid component (A) more preferably contains three to eight, still more preferably three to six diprotic acids. It is also preferred that the diprotic acid component (A) contains diprotic acids each having a carbon number (which can also be referred to as the number of carbon atoms) of 7 or more.

Preferably, the diprotic acid component (A) contains k different kinds of diprotic acids (a1) to (ak) each having a carbon number of 7 or more, where k is an integer of 3 or greater. The diprotic acid component (A) preferably contains three or more diprotic acids (a1) to (ak) each having a carbon number of 7 or more (k is an integer of 3 or greater), more preferably three to eight diprotic acids (a1) to (ak) (k is 3 to 8), particularly preferably four to six diprotic acids (a1) to (ak) (k is 4 to 6). The k diprotic acids each having a carbon number of 7 or more are preferably k diprotic acids having different carbon numbers.

The two or more diprotic acids in the diprotic acid component (A) (i.e., the two or more diprotic acids characterized such that the acid anhydride mixture (E) corresponding to the diprotic acid mixture of the two or more diprotic acids is a liquid at 50° C.) are preferably k different kinds of diprotic acids (a1) to (ak) having a carbon number of 7 or more, where k is an integer of 3 or greater. The diprotic acids each having a carbon number of 7 or more are preferably compounds represented by the later-described formula (1), for example.

It is more preferred that the sum of $n_1$ to $n_k$ is 9 or more, still more preferably 12 or more, where $n_1$ to $n_k$ are total numbers of tertiary and quaternary carbon atoms in one molecule of the diprotic acid (a1) to (ak), respectively, each having a carbon number of 7 or more.

It is because when the sum of tertiary and quaternary carbon atoms is 9 or more, the diprotic acid component (A) has a lower crystallization temperature, resulting in an electrolyte solution for electrolytic capacitors that does not precipitate even at lower temperatures and that is thus more suitable for use in cold areas. The upper limit of the sum of $n_1$ to $n_k$ is not particularly limited, but it is preferably 50 or less, more preferably 30 or less. The sum of $n_1$ to $n_k$ is preferably 9 to 50, more preferably 12 to 30, for example.

A tertiary carbon atom is considered to be a carbon atom in which three bonds out of four bonds are bound to other carbon atoms. A quaternary carbon atom is considered to be a carbon atom in which all of the four bonds are bound to other carbon atoms.

The numbers of tertiary and quaternary carbon atoms are counted as follows: for example, in the case of a carbon-carbon double bond ($C_a=C_b$), both $C_a$ and $C_b$ are considered to already have two carbon atoms adjacent thereto, and if there is one more carbon atom adjacent thereto, they are tertiary carbon atoms; while if there are two more carbon atoms adjacent thereto, they are quaternary carbon atoms.

The following explains the sum of $n_1$ to $n_k$, taking a case where the diprotic acid component (A) contains 2-octenylsuccinic acid (referred to as "diprotic acid (a1)"), 2-dodecenylsuccinic acid (referred to as "diprotic acid (a2)"), and 2-hexadecenylsuccinic acid (referred to as "diprotic acid (a3)") as three different diprotic acids each having a carbon number of 7 or more. In this case, the total number ($n_1$) of tertiary and quaternary carbon atoms in one molecule of 2-octenylsuccinic acid (the diprotic acid (a1)) is 3. The total number ($n_2$) of tertiary and quaternary carbon atoms in one molecule of 2-dodecenylsuccinic acid (the diprotic acid (a2)) is 3. The total number ($n_3$) of tertiary and quaternary carbon atoms in one molecule of 2-hexadecenylsuccinic acid (the diprotic acid (a3)) is 3.

Thus, when the diprotic acid component (A) contains the diprotic acids (a1) to (a3) (2-octenylsuccinic acid, 2-dodecenylsuccinic acid, and 2-hexadecenylsuccinic acid) as diprotic acids each having a carbon number of 7 or more, the sum of $n_1$ to $n_3$ is 9, where $n_1$ to $n_3$ are total numbers of tertiary and quaternary carbon atoms in one molecule of the diprotic acid (a1) to (a3), respectively.

The diprotic acids contained in the diprotic acid component (A) are preferably compounds represented by the following formula (1). The diprotic acid component (A) preferably contains two or more, more preferably three or more diprotic acids represented by the following formula (1). The diprotic acids represented by the following formula (1) are preferably two or more compounds having different carbon numbers, more preferably three or more compounds having different carbon numbers. The diprotic acid component (A) preferably contains three to eight, more preferably three to six, still more preferably four to six diprotic acids having different carbon numbers, which are represented by the formula (1):

[Chem. 1]

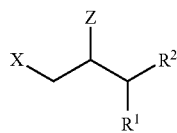

(1)

in the formula (1), X and Z are each independently a carboxy group, a sulfonic acid group, or a phosphoric acid group; $R^1$ is a hydrogen atom or a C1-C18 hydrocarbon group; $R^2$ is a C2-C20 hydrocarbon group containing at least one unsaturated bond; and the total carbon number of $R^1$ and $R^2$ is 6 to 20.

The unsaturated bond in $R^2$ is preferably a carbon=carbon unsaturated bond (C=C). X and Z are each independently an acid group selected from a carboxy group, a sulfonic acid group, and a phosphoric acid group. Preferably, X and Z are both carboxy groups.

The carbon number of the diprotic acids contained in the diprotic acid component (A) and the sum of $n_1$ to $n_k$ can be analyzed, for example, with a liquid chromatography mass spectrometer, a gas chromatography mass spectrometer, or a nuclear magnetic resonance (NMR) spectrometer.

Specific examples of the diprotic acids represented by the formula (1) include diprotic acids in which X and Z are carboxy groups such as 2-octenylsuccinic acid, 2-nonenylsuccinic acid, 2-decylsuccinic acid, 2-undecenylsuccinic acid, 2-dodecenylsuccinic acid, 2-tridecenylsuccinic acid, 2-tetradecenylsuccinic acid, 2-pentadecenylsuccinic acid, 2-hexadecenylsuccinic acid, 2-heptadecenylsuccinic acid, 2-octadecenylsuccinic acid, 3-carboxy-4-methyl-5-nonenoic acid, 3-carboxy-4-methyl-5-decenoic acid, 3-carboxy-4-methyl-5-undecanoic acid, 3-carboxy-4-methyl-5-dodecenoic acid, 3-carboxy-4-methyl-5-tridecenoic acid, 3-carboxy-4-methyl-5-tetradecenoic acid, and 3-carboxy-4-methyl-5-pentadecenoic acid; diprotic acids in which X and Z are sulfonic acid groups such as 2-sulfo-4-octenesulfonic acid, 2-sulfo-4-nonenesulfonic acid, 2-sulfo-4-decenesulfonic acid, 2-sulfo-4-undecenesulfonic acid, 2-sulfo-4-dodecenesulfonic acid, 2-sulfo-3-methyl-4-octenesulfonic acid, 2-sulfo-3-methyl-4-nonenesulfonic acid, 2-sulfo-3-methyl-4-decenesulfonic acid, 2-sulfo-3-methyl-4-undecenesulfonic acid, and 2-sulfo-3-methyl-4-dodecenesulfonic acid; diprotic acids in which X and Z are phosphoric acid groups such as 2-phosphono-4-octenylphosphonic acid, 2-phosphono-4-nonenylphosphonic acid, 2-phosphono-4-decenylphosphonic acid, 2-phosphono-4-undecenylphosphonic acid, 2-phosphono-4-dodecenylphosphonic acid, 2-phosphono-3-methyl-4-octenylphosphonic acid, 2-phosphono-3-methyl-4-nonenylphosphonic acid, 2-phosphono-3-methyl-4-dodecenylphosphonic acid, 2-phosphono-3-methyl-4-undecenylphosphonic acid, and 2-phosphono-3-methyl-4-dodecenylphosphonic acid. Among the diprotic acids represented by the formula (1), those having a total carbon number of $R^1$ and $R^2$ of 7 or more and 20 or less are preferred, those having a total carbon number of 7 or more and 18 or less are more preferred, those having total carbon number of 7 or more and 16 or less are still more preferred, and those having a total carbon number of 9 or more and 15 or less are particularly preferred.

Such diprotic acids having two acid groups are preferably those represented by the formula (1) wherein X and Z are carboxy groups. Such diprotic acids can be prepared by hydrolysis of corresponding acid anhydrides represented by the following formula (2), for example:

[Chem. 2]

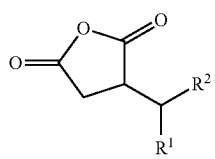

(2)

in the formula (2), $R^1$ is a hydrogen atom or a C1-C18 hydrocarbon group; $R^2$ is a C2-C20 hydrocarbon group containing at least one unsaturated bond; and the total carbon number of $R^1$ and $R^2$ is 6 to 20.

The unsaturated bond in $R^2$ is preferably a carbon-carbon unsaturated bond.

Example of the base (B) in the present invention include ammonia; primary amines such as butylamine and ethanolamine; secondary amines such as dimethylamine, ethylmethylamine, and diethylamine; tertiary amines such as trimethylamine, triethylamine, and ethyldimethylamine; and quaternary ammonium cations such as tetramethylammonium, 1,2,3,4-tetramethylimidazolinium, and 1-ethyl-2,3-methylimidazolinium. These may be used alone or in combination of two or more thereof. Among these, ammonia, secondary amines, and tertiary amines are preferred, and ammonia and secondary amines are more preferred. A salt of the diprotic acid component (A) and the base (B) is preferably an ammonium salt or a secondary amine salt.

The amount of the electrolyte consisting of a salt of the diprotic acid component (A) and the base (B) is preferably 0.1 to 30% by weight, particularly preferably 1 to 20% by weight, based on the weight of the electrolyte solution for electrolytic capacitors.

The solvent (C) in the present invention may be any polar solvent commonly used in electrolyte solutions for electrolytic capacitors. Specific examples include ethylene glycol, propylene glycol, diethylene glycol, N-methylformamide, N,N-dimethylformamide, N-ethylformamide, γ-butyrolactone, acetonitrile, sulfolane, dimethylsulfoxide, and ethylmethylsulfone. These solvents may be used alone or in combination of two or more thereof. The solvent (C) is preferably ethylene glycol or γ-butyrolactone, more preferably ethylene glycol.

The electrolyte solution for electrolytic capacitors of the present invention may contain, as necessary, various additives (D) commonly used in electrolyte solutions. The additives (D) may be used alone or in combination of two or more thereof.

In order to absorb hydrogen gas that occurs during drive, for example, nitro compounds such as o-nitrobenzoate, p-nitrobenzoate, m-nitrobenzoate, o-nitrophenol, and p-nitrophenol can be added. In order to increase the withstand voltage, additives such as boric acid and polyvinyl alcohol can be added.

The amount of the additives (D) is preferably 5% by weight or less, particularly preferably 0.1 to 2% by weight, based on the weight of the electrolyte solution for electrolytic capacitors, in view of specific conductivity and solubility in the electrolyte solution.

The electrolyte solution for electrolytic capacitors of the present invention is best suited for aluminum electrolytic capacitors.

The aluminum electrolytic capacitors may be of any type. Examples include a winding-type electrolytic capacitor in which an anode (aluminum oxide foil) including an aluminum oxide formed on its surface and cathode aluminum foil are wound up with a separator therebetween.

An electrolytic capacitor can be obtained by, for example, impregnating a separator with the electrolyte solution for electrolytic capacitors of the present invention as an electrolyte solution for driving; placing the electrolyte solution with the anode and the cathode in a bottomed tubular aluminum case; and then sealing an opening of the aluminum case with a sealing rubber.

Electrolytic capacitors including the electrolyte solution for electrolytic capacitors of the present invention are also encompassed by the present invention.

EXAMPLES

The present invention is described in more detail below with reference to examples and comparative examples, but the present invention is not limited thereto. In the following, "part(s)" is "part(s) by weight" unless otherwise indicated.

Liquid chromatography mass spectrometry in the examples was performed using a device "LCT Premier XE" (available from Waters) and a column "ACQUITY UPLC O18" (available from Waters).

The mobile phase A was a mixture of aqueous solution of ammonium acetate/methanol (80/20 (volume ratio)), and the mobile phase B was acetonitrile. The volume ratio of A/B was 40/60. ESI was used as the ionization method in mass spectrometer.

Production Example 1

To a stainless steel autoclave provided with a stirrer and a temperature controller were added propylene tetramer (trade name: PROPYLENE TETRAMER available from Formosan Union Chemical Corp.) (252 parts) and maleic anhydride (98 parts), and the gas phase in the system was purged with nitrogen with stirring at room temperature. The temperature was increased to 220° C. over one hour, and subsequently, reaction proceeded for seven hours with the reaction temperature controlled at 220° C. Thus, a reaction raw product (350 parts) was obtained.

The reaction raw product obtained was heated to 165° C. over four hours under reduced pressure (gauge pressure: −0.95 MPa) to remove unreacted propylene tetramer (84 parts). Subsequently, the reaction raw product was further heated to 180° C. Thus, an acid anhydride mixture (E-1) (200 parts) of acid anhydrides as components distilled at a temperature range of 180° C. to 220° C. under reduced pressure (gauge pressure: −0.95 MPa) was obtained. The state of the acid anhydride mixture (E-1) at 50° C. was a liquid.

In a 100-mL glass container, the acid anhydride mixture (E-1) (30 parts) was added to water (30 parts), followed by heating with stirring at 90° C. for one hour. Then, ethyl acetate (45 parts) was added to the mixture and stirred. Subsequently, the mixture was left to stand for separation to collect an ethyl acetate layer, and ethyl acetate was evaporated off. Thus, a diprotic acid mixture (A-1) (31 parts) was obtained.

The diprotic acid mixture (A-1) was analyzed with the liquid chromatography mass spectrometer. As a result, the distribution of carbon numbers as shown in Table 1 was found. The "%" in Table 1 is "mol %". The diprotic acid mixture (A-1) contained five diprotic acids having different carbon numbers. The diprotic acid mixture (A-1) obtained above is also referred to as the diprotic acids (A-1).

TABLE 1

| Carbon number | Amount (%) |
| --- | --- |
| 14 | 2 |
| 15 | 10 |
| 16 | 80 |
| 17 | 6 |
| 18 | 2 |

Fragmentation analysis in the liquid chromatography mass spectrometry reveals that the five diprotic acids respectively having carbon numbers of 14 to 18 shown in Table 1 were all diprotic acids represented by the formula (1), wherein X and Z are carboxy groups. Among the five diprotic acids having different carbon numbers in the diprotic acid mixture (A-1), the C14 diprotic acid shown in Table 1 had a structure represented by the formula (1), wherein $R^1$ is a hydrogen atom and $R^2$ is a C9 hydrocarbon group having one C=C double bond. The C14 diprotic acid shown in Table 1 was a compound having two branched structures.

The C15 diprotic acid shown in Table 1 had a structure represented by the formula (1), wherein $R^1$ is a hydrogen atom and $R^2$ is a C10 hydrocarbon group having one C=C double bond. The C15 diprotic acid was a compound having two branched structures.

The C16 diprotic acid had a structure represented by the formula (1), wherein $R^2$ is a C11 hydrocarbon group. The C17 diprotic acid had a structure represented by the formula (1), wherein $R^2$ is a C12 hydrocarbon group. The C18 diprotic acid had a structure represented by the formula (1), wherein $R^2$ is a C13 hydrocarbon group. Each of the C16 diprotic acid, C17 diprotic acid, and C18 diprotic acid had a structure represented by the formula (1), wherein $R^1$ is a hydrogen atom, and $R^2$ has one C=C double bond. Each of the C16 diprotic acid, C17 diprotic acid, and C18 diprotic acid was a compound having two branched structures.

With regard to the five C14-C18 diprotic acids contained in the diprotic acid mixture (A-1), the sum (the sum of $n_1$ to $n_5$) of tertiary and quaternary carbon atoms in one molecule of these five diprotic acids (diprotic acids (a1) to (a5)) was determined. In one molecule of each of the five C14-C18 diprotic acids, the total number of tertiary carbon atoms is 5, and the total number of quaternary carbon atoms is 0. Thus, $n_1=n_2=n_3=n_4=n_5=5$. Therefore, the sum of $n_1$ to $n_5$ is: 5×5=25.

Production Example 2

To a stainless steel autoclave provided with a stirrer and a temperature controller were added LINEALENE 148 (available from Idemitsu Kosan Co., Ltd.) (315 parts) and maleic anhydride (98 parts), and the gas phase in the system was purged with nitrogen with stirring at room temperature. The temperature was increased to 220° C. over one hour, and subsequently, reaction proceeded for seven hours with the reaction temperature controlled at 220° C. Thus, a reaction raw product (413 parts) was obtained.

The reaction raw product obtained was heated to 175° C. over four hours under reduced pressure (gauge pressure: −0.95 MPa)' to remove unreacted LINEALENE 148 (105 parts). Subsequently, the reaction raw product was further heated to 200° C. Thus, an acid anhydride mixture (5-2) (235 parts) which is a component distilled at a temperature range of 200° C. to 240° C. under reduced pressure (gauge pressure: −0.95 MPa) was obtained. The state of the acid anhydride mixture (5-2) at 50° C. was a liquid.

In a 100-mL glass container, the acid anhydride mixture (E-2) (30 parts) was added to water (30 parts), followed by heating with stirring at 90° C. for one hour. Then, ethyl acetate (45 parts) was added to the mixture and stirred. Subsequently, the mixture was left to stand for separation to collect an ethyl acetate layer, and ethyl acetate was evaporated off. Thus, a diprotic acid mixture (A-2) (31 parts) was obtained.

The diprotic acid mixture (A-2) was analyzed with the liquid chromatography mass spectrometer. As a result, the distribution of carbon numbers as shown in Table 2 was found. The "%" in Table 2 is "mol %". The diprotic acid mixture (A-2) contained three diprotic acids having different carbon numbers. The diprotic acid mixture (A-2) obtained above is also referred to as the diprotic acids (A-2).

TABLE 2

| Carbon number | Amount (%) |
|---|---|
| 18 | 33 |
| 20 | 38 |
| 22 | 29 |

Fragmentation analysis in the liquid chromatography mass spectrometry reveals that the three diprotic acids having different carbon numbers contained in the diprotic acid mixture (A-2) were all diprotic acids represented by the formula (1), wherein X and Z are carboxy groups. Among the three diprotic acids having different carbon numbers in the diprotic acid mixture (A-2), the C18 diprotic acid shown in Table 2 had a structure represented by the formula (1), wherein $R^1$ is a hydrogen atom and $R^2$ is a C13 hydrocarbon group having one C=C double bond. The C18 diprotic acid was a compound having two branched structures.

The C20 diprotic acid shown in Table 2 had a structure represented by the formula (1), wherein $R^1$ is a hydrogen atom and $R^2$, is a C15 hydrocarbon group having one C=C double bond.

The C20 diprotic acid was a compound having two branched structures. The C22 diprotic acid had a structure represented by the formula (1), wherein $R^1$ is a hydrogen atom and $R^2$ is a C17 hydrocarbon group having one C=C double bond. The C22 diprotic acid was a compound having two branched structures.

With regard to the three C18-C22 diprotic acids contained in the diprotic acid mixture (A-2), the sum (the sum of $n_1$ to $n_3$) of tertiary and quaternary carbon atoms in one molecule of these diprotic acids (diprotic acids (a1) to (a3)) was determined. In one molecule of each of the three C18-C22 diprotic acids, the total number of tertiary carbon atoms is 5, and the total number of quaternary carbon atoms is 0. Thus, $n_1=n_2=n_3=5$. Therefore, the sum of $n_1$ to $n_3$ is: $5\times3=15$.

Example 1

The diprotic acids (A-1) obtained in Production Example 1 and ethylene glycol (C-1) were mixed according to amounts (parts) shown in Table 3, and diethylamine (B-1) was dropped to the mixture for neutralization. Subsequently, polyvinyl alcohol (D-1) and boric acid (D-2) were added thereto, followed by heating with stirring at 100° C. for homogeneous mixing. Thus, an electrolyte solution (1) was obtained.

Example 2

The diprotic acids (A-1) obtained in Production Example 1 and the ethylene glycol (C-1) were mixed according to amounts (parts) shown in Table 3. Ammonia gas (B-2) was blown thereinto for neutralization until the pH reached 7.0. Subsequently, the polyvinyl alcohol (D-1) and the boric acid (D-2) were added thereto, followed by heating with stirring at 100° C. for homogeneous mixing. Thus, an electrolyte solution (2) was obtained.

Examples 3, 4 and Comparative Examples 1, 2, 4, 5

The same procedure as in Example 1 was repeated using the components according to amounts (parts) shown in Table 3 to obtain electrolyte solutions (3) and (4) as electrolyte solutions of Examples 3 and 4, and electrolyte solutions (1'), (2'), (4'), and (5') as electrolyte solutions of Comparative Examples 1, 2, 4, and 5. In Example 3, the diprotic acids (A-2) obtained in Production Example 2 were used instead of the diprotic acids (A-1) used in Example 1. In Example 4, the three diprotic acids shown in Table 3 were used instead of the diprotic acids (A-1).

Comparative Example 3

The same procedure as in Example 2 was repeated using the components according to amounts (parts) shown in Table 3 to obtain an electrolyte solution (3').

As mentioned in the description of Production Examples 1 and 2 above, the diprotic acids (A-1) and (A-2) as diprotic acid mixtures used in Examples 1 to 3 are characterized such that the acid anhydride mixtures (E-1) and (E-2) respectively corresponding to the diprotic acids (A-1) and (A-2) are liquids at 50° C.

In Example 4, a mixture of three diprotic acids was used. These diprotic acids can be obtained by hydrolysis of corresponding acid anhydrides. The acid anhydride mixture (E) containing three acid anhydrides respectively corresponding to the three diprotic acids used in Example 4 (the molar ratio of these acid anhydrides is the same as that of the diprotic acids used in Example 4) was confirmed to be a liquid at 50° C.

As described above, in Examples 1 to 4, the diprotic acid component (A) in the salt of the diprotic acid component (A) and the base (B) contains two or more diprotic acids, and the mixture containing two or more acid anhydrides, which corresponds to the mixture containing the two or more diprotic acids, is a liquid 50° C. Thus, Examples 1 to 4 are the examples of the present invention.

In contrast, while dodecylsuccinic acid (a-3) used in Comparative Example 1 can be obtained by hydrolysis of dodecyl succinic anhydride (E-3), the dodecyl succinic anhydride (E-3) (an acid anhydride of the dodecylsuccinic acid (a-3)) was a solid at 50° C.

In addition, while 2-dodecenylsuccinic acid (a-5) and 2-hexadecenylsuccinic acid (a-6) used in Comparative Examples 2, 3, and 4 can also be obtained by hydrolysis of their corresponding 2-dodecenylsuccinic anhydride (E-5)

and 2-hexadecenylsuccinic anhydride (E-6), the 2-dodecenylsuccinic anhydride (E-5) and the 2-hexadecenylsuccinic anhydride (E-6) were both solids at 50° C.

Further, in Comparative Example 5, a mixture of two diprotic acids was used, but an acid anhydride mixture containing two acid anhydrides corresponding to these diprotic acids was a solid at 50° C.

Thus, the diprotic acids used in Comparative Examples 1 to 4 are outside the scope of the present invention, because only one diprotic acid is used in each of these comparative examples; and the diprotic acid mixture used in Comparative Example 5 is outside the scope of the present invention although the mixture contains two diprotic acids, because the acid anhydride mixture containing two acid anhydrides corresponding to the diprotic acid mixture was a solid at 50° C.

The electrolyte solutions (1) to (4) and (1') to (5') obtained in Examples 1 to 4 and Comparative Examples 1 to 5 were subjected to visual observation of their states at a low temperature (−20° C.) and measurement of sparking voltage, specific conductivity, specific conductivity before and after storage at high temperatures, and pH. Table 3 shows the measurement results.

In addition, Table 3 shows the state at 50° C. of the acid anhydride mixture (E) corresponding to the diprotic acid mixture used in each of the examples. Table 3 also shows, with regard to the k diprotic acids (a1) to (ak) each having a carbon number of 7 or more (here, k is an integer of 1 or greater), the sum (the sum of $n_1$ to $n_k$) of tertiary and quaternary carbon atoms in one molecule of each of the diprotic acids ($a_1$) to ($a_k$). Table 3 also shows, with regard to each of the comparative examples, the state at 50° C. of the acid anhydride mixture (E) or the acid anhydrides corresponding to the diprotic acid mixture or the diprotic acids used, and the sum (the sum of $n_1$ to $n_k$) of tertiary and quaternary carbon atoms in one molecule of each of the diprotic acids used.

24 hours. Subsequently, the electrolyte solution was visually observed by tilting the glass jar at −20° C., and an evaluation was made based on the following criteria.

Excellent: The solution is clear without precipitates, and flows when the jar is tilted.

Good: The solution is slightly cloudy but without precipitates, and flows when the jar is tilted.

Poor: The solution entirely turned into a solid.

[Measurement of Sparking Voltage]

Chemical etching aluminum foil for high voltage was used as an anode and a cathode, and a voltage value at which voltage drop (short circuit) was observed when a constant current (current density: 10 mA/cm$^2$) was applied at 85° C. was measured as the sparking voltage. GP650-05R available from Takasago Ltd. was used as a stabilized DC power supply.

[Measurement of Specific Conductivity]

The electrolyte solution (15 mL) was placed in a measurement cell, and the specific conductivity was measured with the temperature adjusted at 30° C. in a constant-temperature bath. CT-57101B available from DKKTOA Corporation was used as the specific conductivity measurement cell.

[Measurement of pH]

The pH of the electrolyte solution was measured using a pH meter with the temperature of the electrolyte solution adjusted to 25° C. DST-5421C available from DKKTOA Corporation was used as a pH measurement electrode.

[High-Temperature Test]

The electrolyte solution was placed in a heat-resistant container, and the specific conductivity before and after 500-hour storage in a constant-temperature drier at 125° C. was measured, and the rate of change in specific conductivity was calculated.

TABLE 3

| | | | | Example | | | | Comparative Example | | | | |
|---|---|---|---|---|---|---|---|---|---|---|---|---|
| | | | | 1 | 2 | 3 | 4 | 1 | 2 | 3 | 4 | 5 |
| Amounts (parts) | Electrolyte | Diprotic acid component (A) | Diprotic acids (A-1) (five diprotic acids) | 8 | 7 | — | — | — | — | — | — | — |
| | | | Diprotic acids (A-2) (three diprotic acids) | — | — | 8 | — | — | — | — | — | — |
| | | | Dodecylsuccinic acid (a-3) | — | — | — | — | 8 | — | — | — | — |
| | | | 2-Octenylsuccinic acid (a-4) | — | — | — | 3 | — | — | — | — | — |
| | | | 2-Dodecenylsuccinic acid (a-5) | — | — | — | 3 | — | 8 | 7 | — | 4 |
| | | | 2-Hexadecenylsuccinic acid (a-6) | — | — | — | 2 | — | — | — | 8 | 4 |
| | Base (B) | | Diethylamine (B-1) | 2 | — | 2 | 2 | 2 | 2 | — | 2 | 2 |
| | | | Ammonia gas (B-2) | — | 3 | — | — | — | — | 3 | — | — |
| | Solvent (C) | | Ethylene glycol (C-1) | 88 | 88 | 88 | 88 | 88 | 88 | 88 | 88 | 88 |
| | Additive (D) | | Polyvinyl alcohol (D-1) | 1 | 1 | 1 | 1 | 1 | 1 | 1 | 1 | 1 |
| | | | Boric acid (D-2) | 1 | 1 | 1 | 1 | 1 | 1 | 1 | 1 | 1 |
| | State of acid anhydride mixture (E) corresponding to diprotic acid mixture or state of acid anhydride corresonding to diprotic acid at 50° C. | | | Liquid | Liquid | Liquid | Liquid | Solid | Solid | Solid | Solid | Solid |
| | Sum of $n_1$ to $n_k$ | | | 25 | 25 | 15 | 9 | 3 | 3 | 3 | 3 | 6 |
| Performance evaluation | State of electrolyte solution at −20° C. | | | Excellent | Excellent | Excellent | Good | Poor | Poor | Poor | Poor | Poor |
| | Sparking voltage (V) at 85° C. | | | 570 | 570 | 590 | 570 | 560 | 560 | 560 | 580 | 570 |
| | Specific conductivity at 300° C. (mS/cm) | | | 0.8 | 1.1 | 0.6 | 0.6 | 0.7 | 0.8 | 0.8 | 0.6 | 0.7 |
| | pH | | | 6.4 | 6.5 | 6.2 | 6.2 | 6.2 | 6.4 | 6.4 | 6.5 | 6.3 |
| | Rate of change in specific conductivity in high-temperature test (125° C., 500 hr) | | | −5% | −37% | −5% | −5% | −7% | −6% | −40% | −6% | −6% |

[State of Electrolyte Solution at −20° C.]

The electrolyte solution was placed in a clear glass jar, and left to stand in a constant-temperature bath at −20° C. for According to the results shown in Table 3, the electrolyte solutions of Examples 1 to 3 of the present invention did not contain precipitates and were able to flow even at −20° C.

The electrolyte solution of Example 4 was slightly cloudy at −20° C. but did not contain precipitations and was able to flow when the jar was tilted.

In contrast, the electrolyte solutions of Comparative Examples 1 to 5 each entirely turned into a solid at −20° C.

When the electrolyte solutions are compared based on the salt of the same base (B), the electrolyte solutions of the examples have higher heat resistance (high-temperature test) than the electrolyte solutions of the comparative examples.

Further, the balance between sparking voltage and specific conductivity in the electrolyte solutions of the example is comparable or better than that in the electrolyte solutions of the comparative examples.

INDUSTRIAL APPLICABILITY

The electrolyte solution for electrolytic capacitors of the present invention does not solidify even at low temperatures, so that an electrolytic capacitor that can be driven even in cold areas can be obtained. Thus, such an electrolytic capacitor can be suitably used in outside applications such as in-vehicle applications.

The invention claimed is:

1. An electrolyte solution for electrolytic capacitors, the electrolyte solution comprising:
   a solvent (C); and
   an electrolyte,
   the electrolyte consisting of a salt of a diprotic acid component (A) and a base (B), the diprotic acid component (A) containing two or more diprotic acids,
   wherein the two or more diprotic acids are characterized such that a mixture (E) of two or more acid anhydrides corresponding to a diprotic acid mixture containing the two or more diprotic acids is a liquid at 50° C., with the molar ratio of the acid anhydrides being the same as that of the diprotic acids in the diprotic acid component (A).

2. The electrolyte solution for electrolytic capacitors according to claim 1,
   wherein the diprotic acid component (A) contains k different kinds of diprotic acids (a1) to (ak) each having a carbon number of 7 or more, where k is an integer of 3 or greater, and
   the sum of $n_1$ to $n_k$ is 9 or more, where $n_1$ to $n_k$ are total numbers of tertiary and quaternary carbon atoms in one molecule of the diprotic acid (a1) to (ak), respectively.

3. The electrolyte solution for electrolytic capacitors according to claim 1,
   wherein the diprotic acid component (A) contains a diprotic acid represented by the following formula (1):

[Chem. 1]

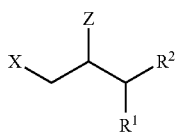

(1)

in the formula (1), X and Z are each independently a carboxy group, a sulfonic acid group, or a phosphoric acid group; $R^1$ is a hydrogen atom or a C1-C18 hydrocarbon group; $R^2$ is a C2-C20 hydrocarbon group containing at least one unsaturated bond; and the total carbon number of $R^1$ and $R^2$ is 6 to 20.

4. The electrolyte solution for electrolytic capacitors according to claim 3,
   wherein X and Z in the formula (1) are both carboxy groups.

5. An electrolytic capacitor comprising:
   the electrolyte solution for electrolytic capacitors according to claim 1.

6. The electrolyte solution for electrolytic capacitors according to claim 2,
   wherein the diprotic acid component (A) contains a diprotic acid represented by the following formula (1):

[Chem. 1]

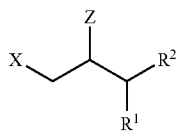

(1)

in the formula (1), X and Z are each independently a carboxy group, a sulfonic acid group, or a phosphoric acid group; $R^1$ is a hydrogen atom or a C1-C18 hydrocarbon group; $R^2$ is a C2-C20 hydrocarbon group containing at least one unsaturated bond; and the total carbon number of $R^1$ and $R^2$ is 6 to 20.

7. The electrolyte solution for electrolytic capacitors according to claim 6,
   wherein X and Z in the formula (1) are both carboxy groups.

8. An electrolytic capacitor comprising:
   the electrolyte solution for electrolytic capacitors according to claim 2.

9. An electrolytic capacitor comprising:
   the electrolyte solution for electrolytic capacitors according to claim 3.

10. An electrolytic capacitor comprising:
    the electrolyte solution for electrolytic capacitors according to claim 4.

11. An electrolytic capacitor comprising:
    the electrolyte solution for electrolytic capacitors according to claim 6.

12. An electrolytic capacitor comprising:
    the electrolyte solution for electrolytic capacitors according to claim 7.

* * * * *